(12) United States Patent
Beck et al.

(10) Patent No.: US 9,987,880 B2
(45) Date of Patent: Jun. 5, 2018

(54) BEARING ASSEMBLY

(71) Applicants: Thilo Beck, Schweinfurt (DE); Rico Dittmar, Schweinfurt (DE)

(72) Inventors: Thilo Beck, Schweinfurt (DE); Rico Dittmar, Schweinfurt (DE)

(73) Assignee: AKTIEBOLAGET SKF, Gothenburg (SE)

(*) Notice: Subject to any disclaimer, the term of this patent is extended or adjusted under 35 U.S.C. 154(b) by 0 days. days.

(21) Appl. No.: 15/044,626

(22) Filed: Feb. 16, 2016

(65) Prior Publication Data
US 2016/0236510 A1  Aug. 18, 2016

(30) Foreign Application Priority Data
Feb. 16, 2015 (DE) .......................... 10 2015 202 720

(51) Int. Cl.
*B60B 27/00* (2006.01)
*F16C 19/52* (2006.01)
*F16C 35/077* (2006.01)
*F16C 19/38* (2006.01)

(52) U.S. Cl.
CPC ........ B60B 27/0078 (2013.01); B60B 27/001 (2013.01); F16C 19/525 (2013.01); F16C 35/077 (2013.01); *B60B 2360/102* (2013.01); *B60B 2360/104* (2013.01); *B60B 2380/14* (2013.01); *B60B 2380/73* (2013.01); *B60B 2380/90* (2013.01); *F16C 19/386* (2013.01); *F16C 2326/02* (2013.01)

(58) Field of Classification Search
CPC .... F16C 19/184; F16C 19/386; F16C 19/525; F16C 33/62; F16C 35/077

USPC .................................................. 384/493, 557
See application file for complete search history.

(56) References Cited

U.S. PATENT DOCUMENTS

| 2,324,676 | A | * | 7/1943 | Butterfield | F16C 17/22 384/278 |
|---|---|---|---|---|---|
| 3,311,431 | A | * | 3/1967 | Hilliard | F16C 17/22 384/493 |
| 4,944,611 | A | | 7/1990 | Ankenbauer et al. | |
| 5,211,489 | A | * | 5/1993 | Moore | F16C 35/077 384/493 |
| 2003/0077016 | A1 | * | 4/2003 | Iarrera | F16C 35/077 384/537 |

(Continued)

FOREIGN PATENT DOCUMENTS

| DE | 102009024988 A1 | 12/2010 |
|---|---|---|
| DE | 102012211261 A1 | 1/2014 |
| EP | 2604445 A1 | 6/2013 |

(Continued)

*Primary Examiner* — James Pilkington
(74) *Attorney, Agent, or Firm* — Bryan Peckjian; SKF USA Inc. Patent Dept.

(57) ABSTRACT

A bearing assembly includes a hub element or a housing element, the hub element or the housing element having at least one opening, at least one intermediate element mounted in the at least one opening, the at least one intermediate element including at least one wave-shaped or lug-shaped projection in contact with the hub element or the housing element, and a first bearing element press-fit in the at least one intermediate element and a second bearing element mounted in the at least one opening, the second bearing element being movable relative to the first bearing element.

13 Claims, 2 Drawing Sheets

(56) References Cited

U.S. PATENT DOCUMENTS

2005/0163410 A1      7/2005  Sakamoto
2010/0150487 A1*     6/2010  Beck .................... F16C 35/062
                                                           384/494

FOREIGN PATENT DOCUMENTS

WO          01/54925   A1    8/2001
WO       2010/060424   A2    6/2010

* cited by examiner

BEARING ASSEMBLY

CROSS-REFERENCE

This application claims priority to German patent application no. 10 2015 202 720.1 filed on Feb. 16, 2015, the contents of which are fully incorporated herein by reference.

TECHNOLOGICAL FIELD

The present disclosure is directed to a bearing assembly including a hub element or housing element with at least one opening for a bearing and at least one bearing element secured in the at least one opening by a press fit.

BACKGROUND

Known bearing assemblies may include a housing element or a hub element that has at least one opening for receiving first and second bearing rings such that the second bearing ring is movable relative to the first bearing ring. These may be used, for example, as wheel hub bearing assemblies in motor vehicles. In such assemblies, the bearing outer ring is usually press fit in the at least one opening on the hub element. The bearing rings must be strong enough to withstand the forces to which they are subjected and are therefore generally made mostly of steel, in particular of rolling-element bearing steel (e.g., 100Cr6). In order to reduce weight, a lighter material, such as aluminum, is often used to form the hub element or housing element.

The light weight of aluminum wheel hubs makes them desirable for wheel-bearing arrangements. A disadvantage of aluminum wheel hubs, however, is that aluminum has a substantially greater coefficient of thermal expansion as compared to that of steel. This means that it is difficult to design the connection or interface between steel parts and aluminum parts for all relevant temperature ranges. The different degrees of expansion may prove particularly troublesome at the press-fit junction between the hub element and the bearing outer ring. At high temperatures the fit between these elements can loosen, since the aluminum hub will expand more than the steel bearing ring. This may allow the bearing outer ring to shift or rotate in the hub, and such movement can damage the hub and/or the bearing.

On the other hand, at low temperatures the aluminum hub strongly constricts the outer ring and may cause high contact stresses. This may cause the hub to crack or may deform the bearing ring, in particular on the raceway.

It was therefore proposed in DE 10 2012 211 261 (family member of U.S. Pat. No. 8,961,028) to provide a specific design for a bearing assembly with a hub element or housing element and a rolling-element bearing outer ring press-fit in a receiving bore. In order to ensure a proper fit of the bearing ring at all operating temperatures, even with the use of different materials for the hub element or housing element and the bearing ring, the designs of the receiving bore and of the outer circumference of the outer ring are configured in a particular manner. Specifically, they are configured such that the radial press-fit between receiving bore and the outer ring is smaller in the region of the raceway than in the region outside the raceway. This can be achieved, for example, by the varying the diameter of the receiving bore or of the outer ring over its axial length.

However, a disadvantage of this conventional approach is that forming the axial extensions of the receiving bore or outer ring with varying diameters is very expensive, and in addition each element must be individually manufactured. Such bearing assemblies are thus very cost-intensive.

SUMMARY

One aspect of the present disclosure is therefore to provide a bearing assembly, in particular for a wheel hub bearing, that is simple to manufacture and that allows for improved mounting of the bearing ring in a housing element or hub element even when the housing element/hub element and bearing ring are formed from materials with different properties.

The present disclosure relates to a bearing assembly including a housing element or hub element that includes at least one opening for a bearing including a first bearing element and a second bearing element movable relative to a first bearing element. The first bearing element is press-fit in the opening. In order to ensure a proper fit of the bearing element in the housing element or hub element even when the housing element or hub element and the bearing element are made of different materials and over a range of operating temperatures, an intermediate element is disposed in the opening, and the first bearing element is received in the intermediate element with press-fit. The intermediate element allows a different press-fit between the intermediate element and the opening and between the bearing ring and the intermediate element. In this manner, the bearing elements can be mounted on or in the opening on the housing element or hub element under the optimal conditions for them. In order to further improve the connection between intermediate element and opening, the intermediate element may include at least one projection that can enter into operative connection with the opening. The projection is preferably wave-shaped and/or lug-shaped. The friction of the intermediate element in the opening can thereby be increased such that radial and axial movement of the intermediate element in the opening is made more difficult or prevented.

According to a further exemplary embodiment it is preferred that the projection engage into a recess formed in the opening. Radial and axial movement of the intermediate element in the opening is thereby further made more difficult or prevented.

According to one further advantageous exemplary embodiment, the housing element or hub element is formed from a first material, in particular aluminum, having a first coefficient of thermal expansion, and the intermediate element is made from a second material, in particular steel, having a second coefficient of thermal expansion different from that of the first coefficient of thermal expansion. A bearing assembly can thereby be provided in which light metal is preferably used for the hub element or housing element, while at the same time rolling-element bearing steel, which is preferred for its superior strength, can be used for the bearing rings. As a result a bearing assembly can be manufactured that is both lightweight and that satisfies the stipulated strength requirements. The intermediate elements between the bearing ring and the hub or housing element help ensure that the different materials of these elements do not directly affect one another.

According to a further advantageous exemplary embodiment, the intermediate element and the bearing element received therein are formed from materials having similar or identical coefficients of thermal expansion or are formed from the same material. This helps ensure that the press-fit between the intermediate element and the bearing element remains essentially constant over a large range of operating temperatures, such as occurs in particular in wheel hub bearing assemblies. This in turn makes it possible that even at high temperatures the bearing element does not loosen from the intermediate element or that the intermediate element is not deformed at very low temperatures.

The intermediate element itself can be press-fit in the housing element or hub element, or it can be directly cast into the material of the housing element or hub element. Of course it is also possible with a plurality of intermediate elements disposed on the bearing housing to attach the intermediate elements to the housing element or the hub element using different attachment methods. However, press fitting the intermediate element in the opening of the housing element or hub element is particularly advantageous. For example, the intermediate element can be received in the opening with a very tight press-fit, so that even at very high temperatures the intermediate element does not loosen significantly. Such a tight press-fit would not be possible for the bearing element itself, since it could deform the precisely prepared raceway or sliding surface of the bearing ring.

The bearing assembly may be a component of a wheel hub bearing assembly and include a first opening and a second opening axially spaced from each other, and first and second rolling element bearings press-fit into the openings. The rolling-element bearings preferably each include an outer ring and an inner ring, and at least one of the outer rings is press-fit in the intermediate element, the intermediate element being disposed in at least one of the openings formed on the hub element. Using the intermediate element of the present disclosure, thermal influences on the hub element and on the outer ring can be decoupled from each other in a simple and cost-effective manner.

Another aspect of the disclosure comprises a bearing assembly including a hub element or a housing element, the hub element or the housing element having at least one opening having an axially facing end wall. At least one intermediate element having a first annular end and a second annular end axially spaced from the first annular end is press-fit in the at least one opening with the first annular end contacting the axially facing end wall of the at least one opening. The at least one intermediate element includes an outer surface that either undulates in a circumferential direction and forms a plurality of undulations or includes a plurality of circumferentially spaced lugs projecting from the outer surface in contact with the hub element or the housing element. A first bearing element is press-fit in the at least one intermediate element, and a second bearing element is mounted in the at least one opening, the second bearing element being movable relative to the first bearing element.

Yet another aspect of the disclosure comprises a bearing assembly that includes a body comprising a hub or a housing, the body having a first side and a second side axially spaced from the first side. There is a first opening in the first side, and the first opening has an axially facing end wall spaced inwardly from the first side. There is a second opening in the second side, and the second opening has an axially facing end wall spaced inwardly from the second side. A first intermediate element having a first annular end and a second annular end axially spaced from the first annular end is press-fit in the first opening with the first annular end in contact with the axially facing end wall of the first opening, and a second intermediate element having a first annular end and a second annular end axially spaced from the first annular end is press-fit in the second opening with the first annular end of the second intermediate element in contact with the axially facing end wall of the second opening. The first and second intermediate elements each include an outer surface, the outer surface either undulating in a circumferential direction and forming a plurality of undulations or including a plurality of circumferentially spaced lugs projecting from the outer surface in contact with the body. The assembly also includes a first bearing having an inner ring and an outer ring, the outer ring of the first bearing being press-fit in the first intermediate element and a second bearing having an inner ring and an outer ring, the outer ring of the second bearing being press-fit in the first intermediate element.

Further advantages and advantageous embodiments are defined in the description, the drawings, and the claims.

In the following aspects of the disclosure are described in more detail with reference to the exemplary embodiments depicted in the Figures. Here the exemplary embodiments illustrated are of a purely exemplary nature and are not intended to establish the scope of the application. This scope is defined solely by the appended claims.

DETAILED DESCRIPTION

In the following, identical or functionally equivalent elements are designated by the same reference numbers.

Figure 1:
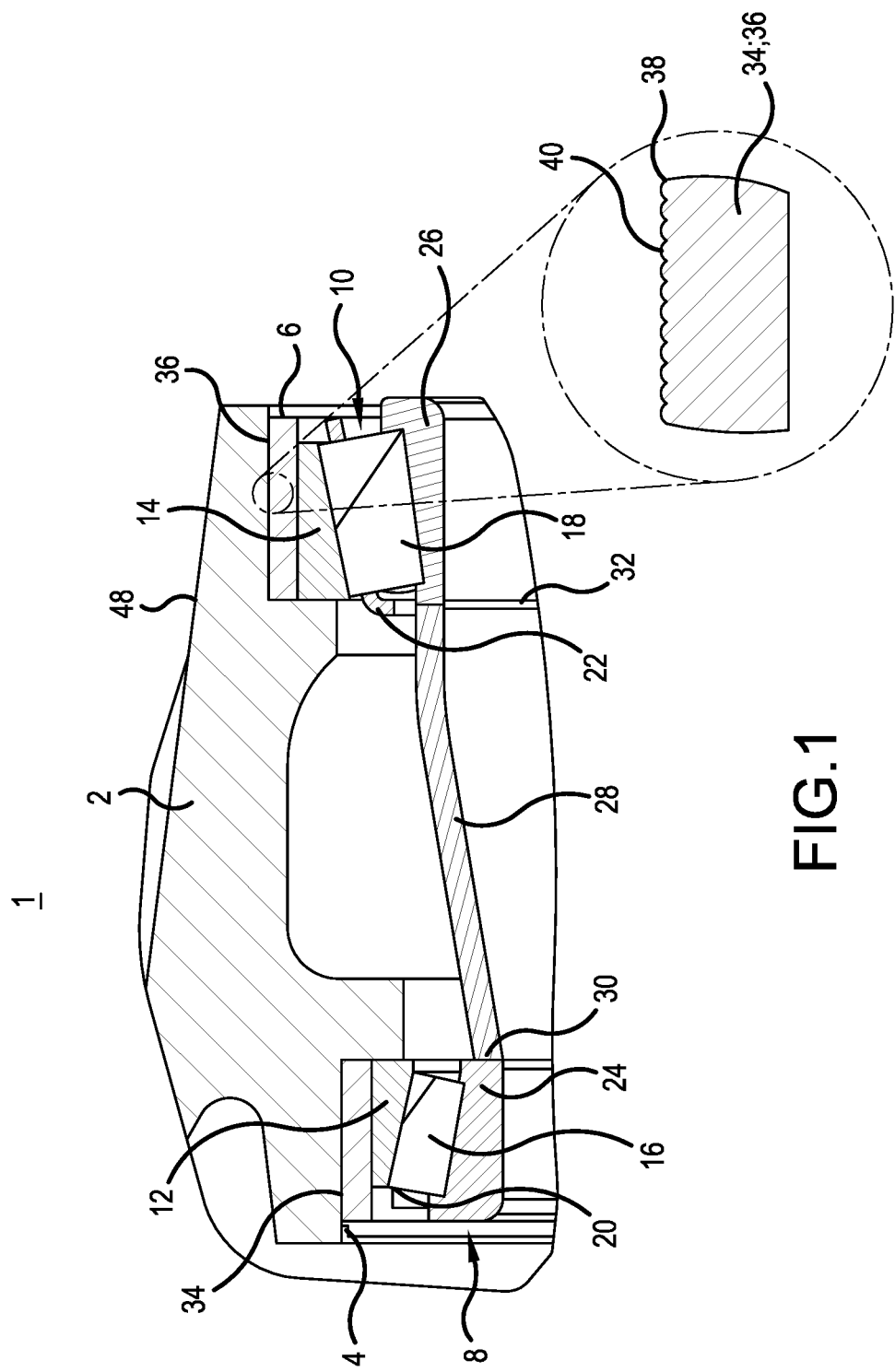
FIG. 1 is a schematic, sectional, side elevational view of a first exemplary embodiment of a bearing assembly according to the disclosure.

In FIG. 1 a wheel bearing 1 is depicted in radial cross-section as a preferred exemplary embodiment of the disclosure. Only the components relevant to the description of the exemplary embodiment are depicted and described. The wheel bearing 1 comprises a hub element 2 for attaching a rim to a wheel bearing 1. First and second openings 4, 6 are formed in the hub element 2, and these first and second openings 4, 6 are configured to receive first and second rolling-element bearings 8, 10, respectively. The rolling-element bearings 8, 10 rotatably support the wheel bearing 1 on a wheel axis (not shown), and each includes an outer ring 12, 14, rolling elements 16, 18, cages, 20, 22, and an inner ring 24, 26. The inner rings 24, 26 have different bore diameters, and the smaller inner ring 24 is disposed behind the larger inner ring 26 with respect to the insertion direction of the wheel axis.

The rolling-element bearings 8 and 10 are axially spaced from each other, and a connecting piece 28 is disposed between the rolling element bearings 8, 10 that is in contact with the inner rings 24, 26 of the rolling element bearings and that fixes the axial spacing of the rolling-element bearings 8, 10 with respect to each other. The connecting piece 28 is preferably sleeve-shaped so that the wheel axis can pass therethrough. The bore diameter of the connecting piece 28 is chosen such that at radially circulating contact points 30, 32 with the inner rings 24, 26 it has essentially the same respective bore diameter as the adjacent inner ring 24, 26. It can optionally be respectively embodied smaller or larger.

Furthermore, FIG. 1 shows intermediate elements 34, 36 disposed between the outer rings 12, 14 and the openings 4, 6. The outer rings 12, 14 are in turn press-fit in these intermediate elements 34, 36. The intermediate elements 34, 36 serve to compensate for the influence of the different coefficients of thermal expansion of the hub element 2 and the outer rings 12, 14, and the intermediate elements 24, 26 may comprise rings or be ring-shaped.

This arrangement is particularly advantageous if the hub element 2 and the outer rings 12, 14 are comprised of different materials. Thus, for example, it is preferable to manufacture the hub element 2 from a light metal, such as aluminum, in order to reduce the total weight of the wheel hub. However, aluminum is itself not a suitable material for forming the outer bearing rings 12, 14, because of the high strength required for bearing rings. The bearing rings 12, 14; 24, 16 are therefore usually manufactured from rolling-element bearing steel (e.g., 100Cr6). Disadvantageously, however, the coefficients of thermal expansion of aluminum and of the rolling-element bearing steel differ significantly; aluminum expands approximately twice as much as steel does per degree of temperature change. Since the wheel bearings may be operated over a temperature range of −40° to 180° C., this difference in coefficients of thermal expansion is not negligible. This in turn makes it very difficult to design the connection or interface between the steel parts and the aluminum parts for all relevant temperature ranges. Thus at high temperatures the fit of the bearing rings 12, 14 mounted directly in the openings 4, 6 can loosen, while at low temperatures the aluminum of the hub element can contract so much that very high contact stresses arise. However, in the present disclosure, this problem is addressed by providing the intermediate elements 34, 36 in the openings 4, 6 in order to compensate for these differences. The intermediate elements 34, 36 are preferably manufactured from steel. Alternatively the intermediate elements 34, 36 can also be manufactured from a material that has a coefficient of thermal expansion similar to that of the of the material from which the outer rings 12, 14 are manufactured. The force of the press-fit between the outer rings 12, 14 and the intermediate elements 34, 36 thereby remains substantially constant over the entire operating temperature range so that damage to the bearing due to overtensioning or loosening of the bearing is prevented.

The intermediate elements 34, 36 in turn can be press-fit in the openings 4, 6 of the hub element 2. The press-fit between the intermediate elements 34, 36 and the openings 4, 6 can also be very tight because temperature-related contractions of the hub element 2 will not substantially affect the bearing outer rings 12, 14. As used herein "very tight" refers to a press-fit that is too tight for mounting a bearing outer ring directly in a hole in a hub or housing.

As shown in the enlarged detail in FIG. 1, the intermediate elements 34, 36 can include a ribbing 40 on their edges 38 facing the hub element 2, which ribbing 40 enters into operative connection with the opening 4, 6 and tightens the press-fit of the intermediate element 34, 36 in the opening 4, 6. Here the ribbing 40 can grab into the material of the hub element such that the friction between the intermediate elements 34, 36 and the openings 4, 6 is increased. In this manner, even at high operating temperatures, the intermediate elements 34, 36 are disposed in the openings 4, 6 such that they are captive and do not rotate.

Figure 2:
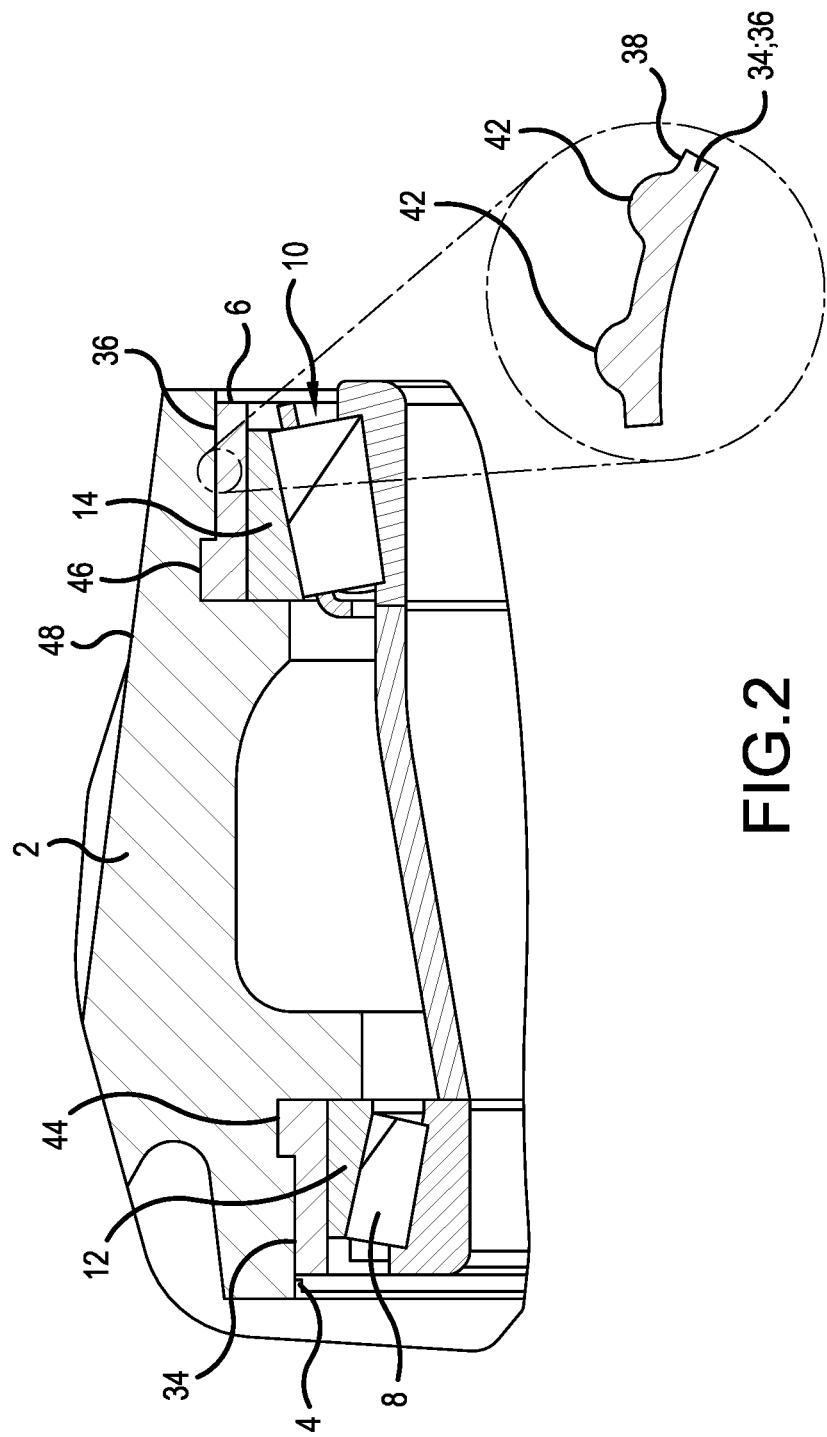
FIG. 2 is a schematic, sectional, side elevational view of a second exemplary embodiment of a bearing assembly according to the disclosure.

As an alternative, FIG. 2 shows the intermediate elements 34, 36 can also be cast into the hub element 2 during the manufacturing process. As the detail in FIG. 2 illustrates, lug-shaped projections can be formed on the radially outer edge of the intermediate elements 34, 36, which lug-shaped projections engage into complementarily designed indentations 44, 46 in the openings 4, 6. Even with large temperature fluctuations the intermediate elements 34, 36 can be radially and axially secured in the openings 4, 6.

In addition, elements (not depicted) can also be disposed on the outer edge 48 of the hub element 2, which elements prevent a thermal expansion of the hub element 2. These elements can also be introduced into the hub element 2 with press-fit or by casting-in.

Overall, using the disclosed intermediate elements 34, 36 a bearing assembly can be provided that is very simple to manufacture and that provides a uniform preload in the bearing. In addition, the bearing outer ring cannot loosen from its seat, which may significantly increase the service life of the bearing.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Wheel bearing
2 Hub element
4, 6 Opening
8, 10 Rolling-element bearing
12, 14 Outer ring
16, 18 Rolling elements
20, 22 Rolling-element bearing cage
24, 26 Inner ring
28 Connecting sleeve
30, 32 Connecting points between connecting sleeve and inner rings
34, 36 Intermediate element
38 Outer edge of the intermediate element
40 Ribbing
42 Lug-shaped projections
44, 46 Indentations in the openings
48 Outer edge of the hub element

What is claimed is:
1. A bearing assembly comprising:
a hub element or a housing element, the hub element or the housing element having at least one opening having an axially facing end wall, at least one intermediate element having a first annular end and a second annular end axially spaced from the first annular end, the at least one intermediate element being press-fit in the at least one opening with the first annular end contacting the axially facing end wall of the at least one opening, the at least one intermediate element including an outer surface, the outer surface either undulating in a circumferential direction and forming a plurality of undulations or including a plurality of circumferentially spaced lugs projecting from the outer surface in contact with the hub element or the housing element;

a first bearing element press-fit in the at least one intermediate element and a second bearing element mounted in the at least one opening, the second bearing element being movable relative to the first bearing element, and wherein the housing element or hub element is formed from a first material having a first coefficient of thermal expansion, and the at least one intermediate element is formed from a second material having a second coefficient of thermal expansion different than the first coefficient of thermal expansion.

2. The bearing assembly according to claim 1, wherein each of the plurality of undulations or each of the plurality of circumferentially spaced lugs project into a one of a plurality of recessed portions of the at least one opening.

3. The bearing assembly according to claim 1, wherein the housing element or hub element is formed from aluminum, and the at least one intermediate element is formed from steel.

4. The bearing assembly according to claim 1, wherein the at least one intermediate element comprises a first intermediate element and a second intermediate element, and wherein the at least one opening comprises a first opening and a second opening, and wherein the first intermediate element is mounted in the first opening and the second intermediate element is mounted in the second opening and wherein each of the first and second intermediate elements are ring-shaped, and including a third bearing element press-fit in the second intermediate element and a fourth bearing element mounted for rotation in the third bearing element.

5. The bearing assembly according to claim 1, wherein no portion of the at least one intermediate element extends past the axially facing end wall.

6. The bearing assembly according to claim 1, wherein at a given temperature, a press fit between the hub element or the housing element and the at least one intermediate element is tighter than a press fit between the at least one intermediate element and the first bearing element.

7. A bearing assembly comprising:
a hub element or a housing element, the hub element or the housing element having at least one opening having an axially facing end wall,
at least one intermediate element having a first annular end and a second annular end axially spaced from the first annular end, the at least one intermediate element being press-fit in the at least one opening with the first annular end contacting the axially facing end wall of the at least one opening, the at least one intermediate element including an outer surface, the outer surface either undulating in a circumferential direction and forming a plurality of undulations or including a plurality of circumferentially spaced lugs projecting from the outer surface in contact with the hub element or the housing element; and a first bearing element press-fit in the at least one intermediate element and a second bearing element mounted in the at least one opening, the second bearing element being movable relative to the first bearing element, wherein the at least one intermediate element and the first bearing element are formed from a same material.

8. A bearing assembly comprising:
a body comprising a hub or a housing, the body having a first side and a second side axially spaced from the first side;
a first opening in the first side, the first opening having an axially facing end wall spaced inwardly from the first side;
a second opening in the second side, the second opening having an axially facing end wall spaced inwardly from the second side;
a first intermediate element having a first annular end and a second annular end axially spaced from the first annular end, the first intermediate element being press-fit in the first opening with the first annular end in contact with the axially facing end wall of the first opening;
a second intermediate element having a first annular end and a second annular end axially spaced from the first annular end, the second intermediate element being press-fit in the second opening with the first annular end of the second intermediate element in contact with the axially facing end wall of the second opening;
the first and second intermediate elements each including an outer surface, the outer surface either undulating in a circumferential direction and forming a plurality of undulations or including a plurality of circumferentially spaced lugs projecting from the outer surface in contact with the body, and
a first bearing having an inner ring and an outer ring, the outer ring of the first bearing being press-fit in the first intermediate element;
a second bearing having an inner ring and an outer ring, the outer ring of the second bearing being press-fit in the second intermediate element,
wherein the body is formed from a first material having a first coefficient of thermal expansion, and the first intermediate element is formed from a second material having a second coefficient of thermal expansion different than the first coefficient of thermal expansion.

9. The bearing assembly according to claim 8, wherein the axially facing wall of the first opening lies in a first plane and the axially facing wall of the second opening lies in a second plane and wherein no portion of the first intermediate element is located between the first plane and the second plane and no portion of the second intermediate element is located between the first plane and the second plane.

10. The bearing assembly according to claim 8, wherein each of the plurality of undulations of the first intermediate element or each of the plurality of circumferentially spaced lugs of the first intermediate element project into a one of a plurality of recessed portions of the first opening.

11. The bearing assembly according to claim 8, wherein the body is formed from aluminum, and the first intermediate element is formed from steel.

12. The bearing assembly according to claim 8, wherein the at least one intermediate element and the outer ring of the first bearing are formed from a same material.

13. The bearing assembly according to claim 8, wherein at a given temperature, a press fit between the body and the first intermediate element is tighter than a press fit between the first intermediate element and the outer ring of the first bearing.

* * * * *